F. G. KOEHLER.
SHOCK ABSORBER FOR VEHICLES.
APPLICATION FILED JAN. 15, 1908.
944,675.
Patented Dec. 28, 1909.
2 SHEETS—SHEET 1.
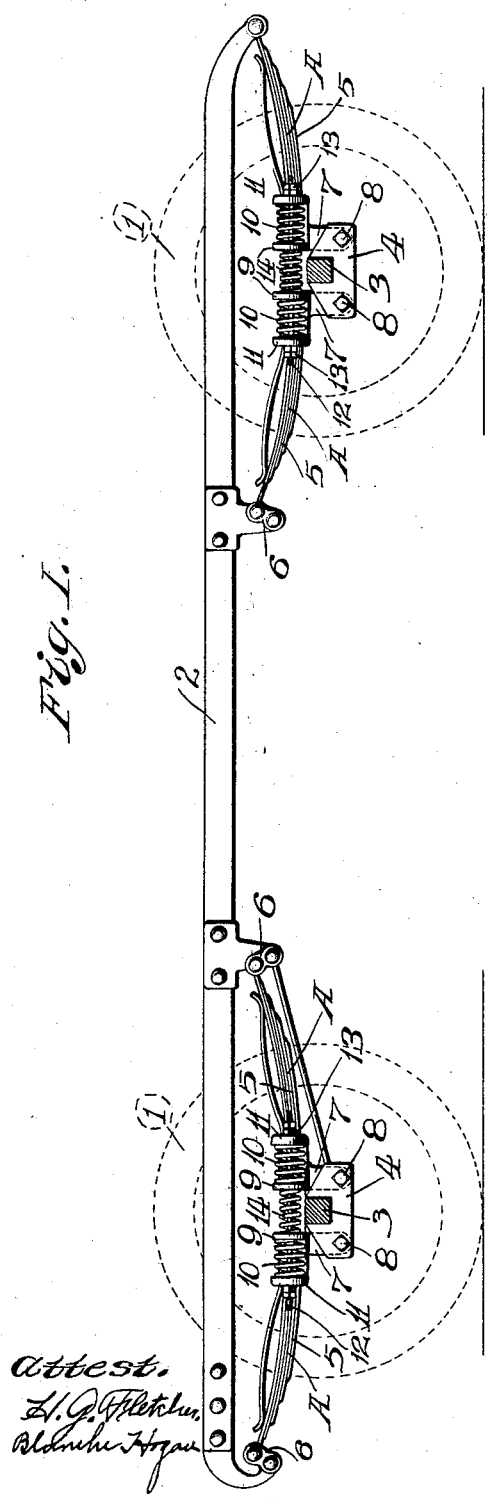
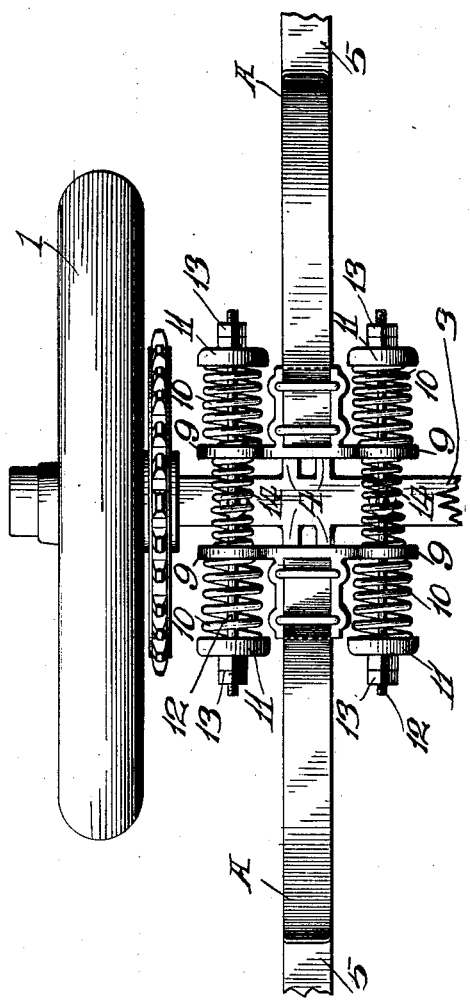

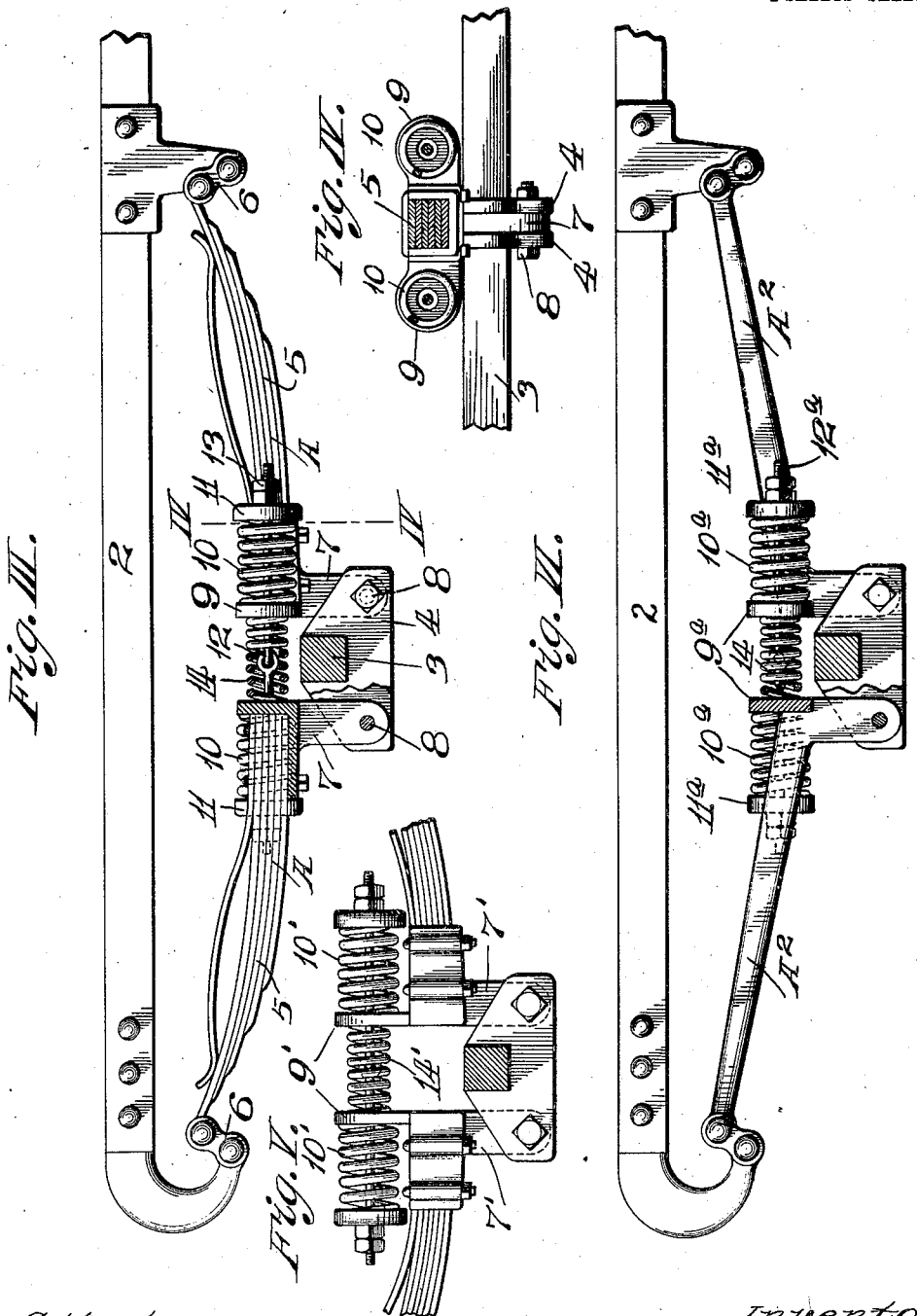

UNITED STATES PATENT OFFICE.

FRANK G. KOEHLER, OF ST. LOUIS, MISSOURI.

SHOCK-ABSORBER FOR VEHICLES.

944,675.

Specification of Letters Patent. Patented Dec. 28, 1909.

Application filed January 15, 1908. Serial No. 410,909.

*To all whom it may concern:*

Be it known that I, FRANK G. KOEHLER, a citizen of the United States of America, residing in the city of St. Louis and State of Missouri, have invented certain new and useful Improvements in Shock-Absorbers for Vehicles, of which the following is a full, clear, and exact description, reference being had to the accompanying drawing, forming part of this specification.

My invention relates to that character of devices utilized in vehicles for the purpose of minimizing the transference of shocks from the ground wheels of the vehicles to the body frames thereof.

Cross reference is made to my co-pending application filed of even date herewith, Serial Number 410910.

Figure I is in part an elevation and in part a vertical longitudinal section of a vehicle having my shock absorbing device incorporated therein. Fig. II is an enlarged top or plan view of one of the shock absorbing devices. Fig. III is in part an enlarged elevation and in part a vertical section of one of the shock absorbing devices. Fig. IV is a vertical cross section taken on line IV—IV, Fig. III. Fig. V is an elevation of the central portion of the shock absorbing device and illustrating a modification. Fig. VI is a view similar to Fig. III, illustrating another modification.

In the accompanying drawings, and having reference first to Figs. I to IV inclusive: 1 designates the ground wheels of a vehicle, 2 the vehicle body frame and 3 the vehicle axles. The axles 3 are provided with bearing lugs 4, which are preferably integral with the axle and are preferably located near the ground wheels by which the axles are supported.

A designates bearers that serve as supports for the body frame 2 and which comprise outer arms 5 of laminated spring type that are connected to the body frame by links 6. The bearers A also comprise inner bearer members 7 having lower arms that are united to the lugs 4 carried by the axle through the medium of pivot bolts 8, thus providing for a rocking motion of the bearers. The upper arms of the inner bearer members to which the inner ends of the arm 5 of the bearers are attached, are provided with laterally extending spring seat extensions 9 offset from the arms 5 and each inner bearer arm is therefore provided with two of such spring seat extensions. 10 are cushion springs seated against the outer faces of the spring seat extensions 9. These cushion springs are held at the position stated by spring seat caps 11 that bear against their outer ends and by rods 12, preferably of sectional form which extend longitudinally of the shock absorbing device, through the spring seat extension, the cushion springs and the spring seat caps. The outer ends of the rods 12 are threaded and the spring seat caps with the cushion springs confined between them and the spring seat extensions are held in place by retaining nuts 13 fitted to said rods. Between the spring seat extensions 9 are take-up springs 14 of less strength than the cushion springs 10, these take-up springs being located around the rods 12 which serve as supports therefor.

When, in the use of a vehicle containing one or more of my shock absorbing devices, a blow is delivered to the ground wheel of the vehicle, the force of such blow is transmitted to the axle mounted in said wheel and from said axle to the lower arms of the bearers A. The force of the blow acts to elevate the inner ends of the bearers due to the resistance afforded by the body frame 2, and as a consequence the force of such blow is transmitted through the inner members 7 of the bearers to the cushion springs 10, thereby causing the cushion springs to be partially compressed between the spring seat extensions and the spring seat caps 11 in which action they reduce the force of the blow that has been received by the ground wheel and transmitted to the bearers A. As a result the full force of a blow is prevented from being transmitted to the body frame 2, and the only effect of the blow upon the body frame is an easy rise and fall motion, due to the absorption of the force of the blow by the cushion springs. The take-up springs 14 act as a medium for receiving the inner ends of the bearers A upon rebound thereof, due to re-action of the cushion springs and these take-up springs therefore serve as equalizers to maintain the cushion springs in active condition.

In Fig. V, I have shown a modification in which the inner bearer members 7′ are provided with single spring seat extensions 9′ and in which only a single cushion spring 10′ is utilized in conjunction with each bearer A, instead of a pair of cushion springs. In this modification the extensions 9' project upwardly from the inner bearer members and a single take-up spring 14' is interposed between said extensions.

In the modification illustrated in Fig. VI, the bearers A² are of solid form and the outer arms and inner members of said bearers are incorporated therein by making the bearers of L-shape. Each bearer is provided at its inner end above its point of pivotal support with a pair of spring seats 9ª against the outer faces of which the cushion springs 10ª rest. The cushion springs are retained in position by the spring seat caps 11ª and the rods 12ª. 14 are the take-up springs located between the spring seats 9ª. The action in this modified construction of my shock absorbing device is similar to that hereinbefore described with reference to the construction of the device as illustrated in Figs. I to IV inclusive.

I claim:

1. In a shock absorbing device for vehicles, the combination with a vehicle body frame and axle, of a pair of bearers having pivotal connection with said body frame at their outer ends, pivoted to said axle at their inner ends and having spring seats, a cushion spring held to the spring seat of one of said bearers, and a take-up spring interposed between the spring seats of said pair of bearers, substantially as set forth.

2. In a shock absorbing device for vehicles, the combination with a vehicle body frame and axle, of a pair of bearers having pivotal connection with said body frame at their outer ends, pivoted to said axle at their inner ends and having spring seats, cushion springs held against the outer sides of said spring seats, and a take-up spring interposed between the spring seats of said pair of bearers, substantially as set forth.

3. In a shock absorbing device for vehicles, the combination with a vehicle body frame and axle, of a pair of bearers having pivotal connection with said body frame at their outer ends, pivoted to said axle at their inner ends and having spring seats located above the points of pivotal connection of the bearers to said axle, a cushion spring held to a spring seat of one of said bearers above said point of pivotal connection, and a take-up spring interposed between the spring seats of said pair of bearers, substantially as set forth.

4. In a shock absorbing device for vehicles, the combination with a vehicle body frame and axle, of a pair of bearers having pivotal connection with said body frame at their outer ends, pivoted to said axle at their inner ends and having spring seats located above the points of pivotal connection of the bearers to said axle, a pair of cushion springs held to the outer sides of said spring seats above said point of pivotal connection, and a take-up spring interposed between the spring seats of said pair of bearers, substantially as set forth.

5. In a shock absorbing device for vehicles, the combination with a vehicle body frame and axle, of a pair of bearers having pivotal connection with said body frame at their outer ends, pivoted to said axle at their inner ends and having spring seats located above the points of pivotal connection of the bearers to said axle, a rod extending through said spring seats, spring seat caps fitted to said rod, and cushion springs located between said spring seat caps and spring seats, substantially as set forth.

6. In a shock absorbing device for vehicles, the combination with a vehicle body frame and axle, of a pair of bearers having pivotal connection with said body frame at their outer ends, pivoted to said axle at their inner ends and having spring seats located above the points of pivotal connection of the bearers to said axle, a rod extending through said spring seats, spring seat caps fitted to said rod, cushion springs located between said spring seat caps and spring seats, and a take-up spring interposed between said spring seats, substantially as set forth.

FRANK G. KOEHLER.

In the presence of—
BLANCHE HOGAN,
LILY ROST.